(12) United States Patent  (10) Patent No.: US 8,223,957 B2
Dasgupta  (45) Date of Patent: Jul. 17, 2012

(54) RING TONE REMINDERS

(75) Inventor: Sudeep Dasgupta, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1512 days.

(21) Appl. No.: 11/691,729

(22) Filed: Mar. 27, 2007

(65) Prior Publication Data

US 2008/0240411 A1    Oct. 2, 2008

(51) Int. Cl.
*H04M 1/00* (2006.01)

(52) U.S. Cl. ............ 379/373.04; 379/252; 379/373.01; 379/373.02; 379/373.03; 379/374.01; 379/374.02; 379/374.03; 379/375.01; 455/567

(58) Field of Classification Search .................. None
See application file for complete search history.

(56) References Cited

U.S. PATENT DOCUMENTS

| | | | | |
|---|---|---|---|---|
| 5,436,963 | A * | 7/1995 | Fitzpatrick et al. | 379/218.01 |
| 6,072,859 | A * | 6/2000 | Kong | 379/88.16 |
| 6,182,041 | B1 * | 1/2001 | Li et al. | 704/260 |
| 6,466,653 | B1 * | 10/2002 | Hamrick et al. | 379/67.1 |
| 6,640,230 | B1 * | 10/2003 | Alexander et al. | 1/1 |
| 7,602,901 | B1 * | 10/2009 | Kates et al. | 379/373.01 |
| 7,792,264 | B2 * | 9/2010 | Pfleging et al. | 379/207.16 |
| 7,822,186 | B1 * | 10/2010 | Boni | 379/210.01 |
| 7,881,708 | B2 * | 2/2011 | Anttila et al. | 455/418 |
| 2002/0131565 | A1 * | 9/2002 | Scheuring et al. | 379/88.19 |
| 2004/0156486 | A1 * | 8/2004 | Gentry et al. | 379/88.22 |
| 2005/0143103 | A1 * | 6/2005 | Bjorgan et al. | 455/466 |
| 2005/0276407 | A1 * | 12/2005 | Mohler | 379/211.01 |
| 2006/0194626 | A1 * | 8/2006 | Anttila | 455/701 |

* cited by examiner

*Primary Examiner* — Curtis Kuntz
*Assistant Examiner* — Taunya McCarty

(57) ABSTRACT

A device may receive a telephone call, automatically create a ring tone in response to receiving the telephone call, and cause the ring tone to be audibly provided to a user.

21 Claims, 19 Drawing Sheets

| TELEPHONE NUMBER 710 |
|---|
| TELEPHONE NUMBER |
| TELEPHONE NUMBER |
| TELEPHONE NUMBER |
| TELEPHONE NUMBER |
| ⋮ |
| TELEPHONE NUMBER |

RING TONE REMINDERS

BACKGROUND INFORMATION

A device may include a calendar application where a user may store entries corresponding to events for which the user wants reminders. If an event in the calendar application occurs, the device may cause an audible tone to play to alert the user that an event has occurred. The user may then access the calendar application to obtain additional information regarding the event.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Figure 1:
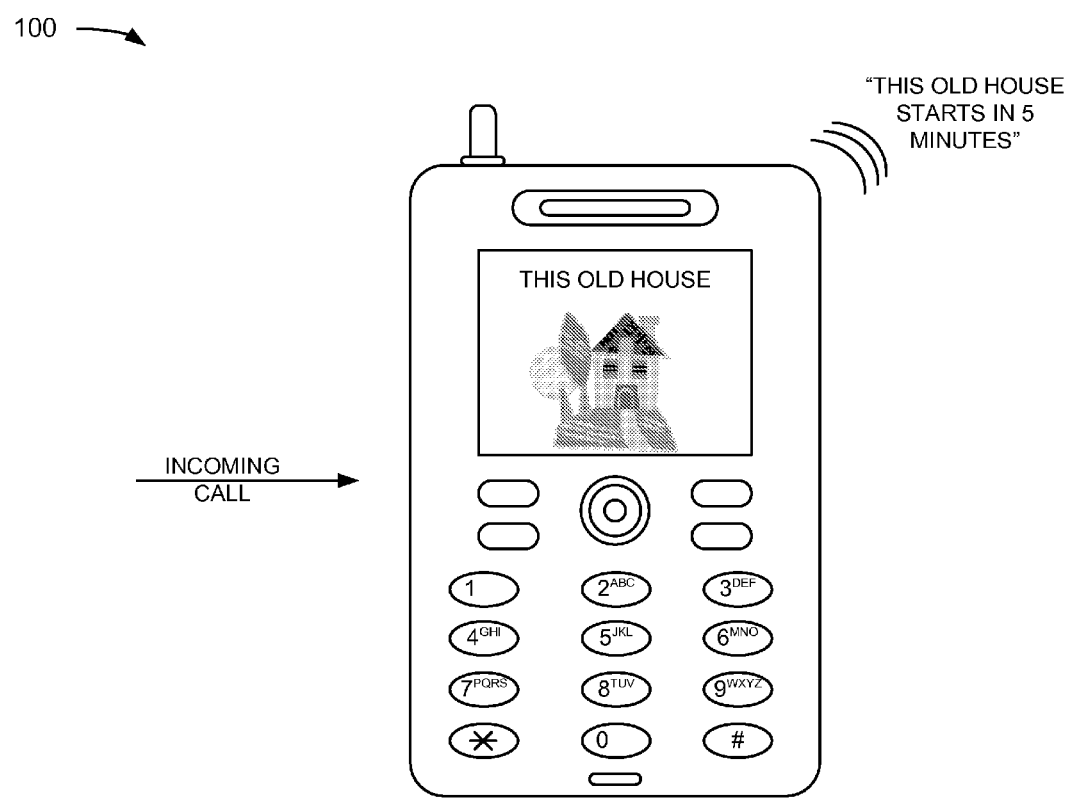
FIG. 1 is an exemplary diagram illustrating a concept described herein.

FIG. 1 is an exemplary diagram illustrating a concept 100 described herein. As illustrated, a reminder may be provided to a user of a cell phone (or another type of device). Prior to or at the time of an appointment associated with the reminder, a server (or other device) may place a telephone call to the user's cell phone. In response to receiving the telephone call, the user's cell phone may play a reminder alert that includes a voice message. In the example illustrated in FIG. 1, the user has set a reminder for a television program that the user enjoys called "This Old House" and the voice message indicates that "This Old House starts in 5 minutes." Thus, the user may be made aware of the start of this television program even when the user is not in close proximity to his/her cell phone.

In addition to providing an audible reminder alert, the cell phone may also provide a graphic reminder to the user. For example, as illustrated in FIG. 1, the cell phone may display a title image or poster art for the television program.

Figure 2:
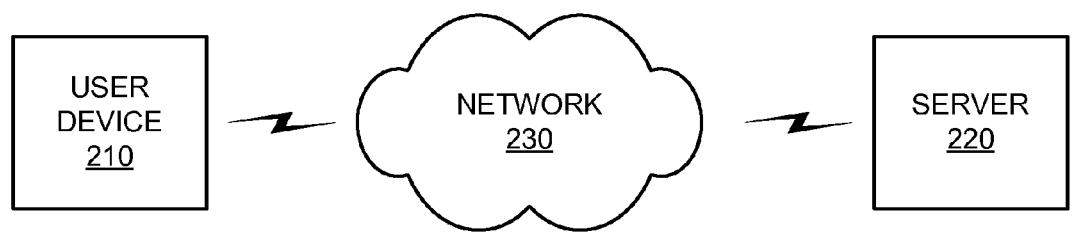
FIG. 2 is an exemplary network in which systems and methods, consistent with exemplary embodiments, may be implemented.

FIG. 2 is an exemplary network in which systems and methods, consistent with exemplary embodiments, may be implemented. As illustrated, network 200 may include a user device 210, a server 220, and a network 230. The number of user devices 210, servers 220, and networks 230 illustrated in FIG. 2 is provided for simplicity. In practice, there may be more user devices 210, servers 220, and networks 230. Moreover, it will be appreciated that in some embodiments, user device 210 may perform functions described as being performed by server 230 and server 230 may perform functions described as being performed by user device 210.

User device 210 may include a telephone device, such as a cell phone, a Voice over Internet Protocol (VoIP) telephone, a personal digital assistant (PDA), and/or another type of device capable of receiving telephone calls and providing audible and possibly visual alerts. User device 210 may connect to network 230 via wired and/or wireless connections.

Server 220 may include a server entity. An entity may be defined as a device, such as a computer or another type of computation or communication device, a thread or process running on one of these devices, and/or an object executable by one of these devices. In one embodiment, server 230 may provide event reminders (e.g., in the form of telephone calls) to user device 210. In one embodiment, server 220 (or another device) may provide audible and/or visual information to user device 210 relating to an event. Server 220 may connect to network 230 via wired and/or wireless connections.

Network 230 may include one or more networks of any type, including a Public Land Mobile Network (PLMN), a Public Switched Telephone Network (PSTN), a local area network (LAN), a metropolitan area network (MAN), a wide area network (WAN), a private network, the Internet, an intranet, and/or another type of network.

Figure 3:
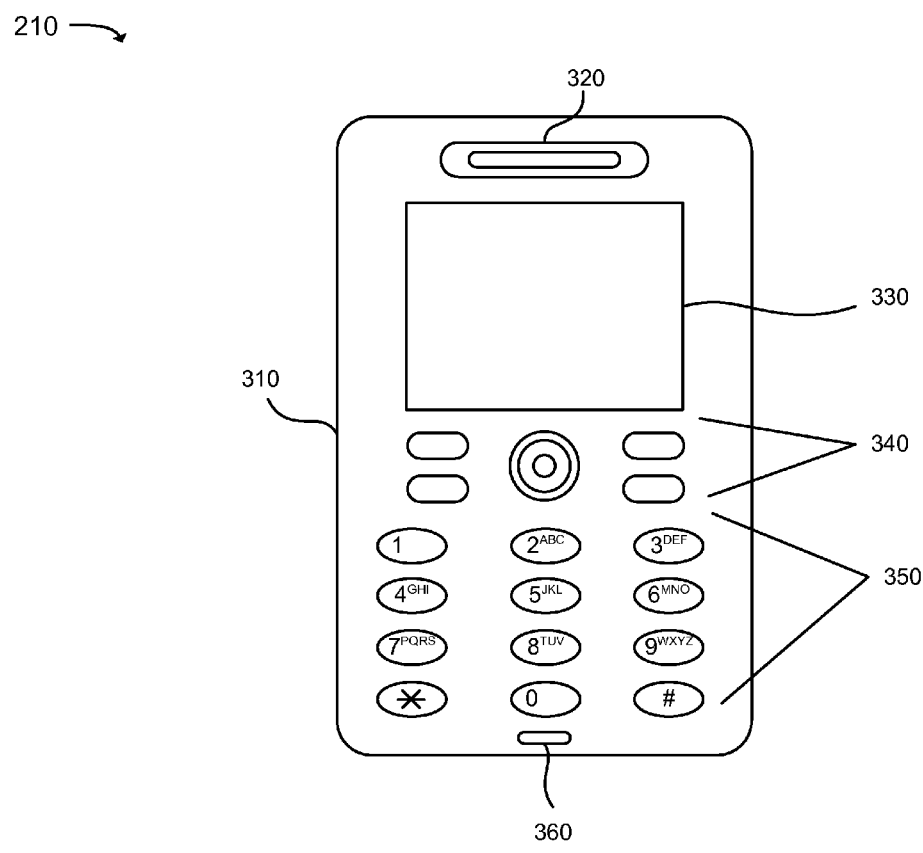
FIG. 3 is an exemplary front view of the user device of FIG. 2 according to one embodiment.

FIG. 3 is an exemplary front view of user device 210 according to one embodiment. As illustrated, user device 210 may include a housing 310, a speaker 320, a display 330, control buttons 340, a keypad 350, and/or a microphone 360. Housing 310 may protect the components of user device 210 from outside elements. Speaker 320 may provide audible information to a user of user device 210.

Display 330 may provide visual information to the user. For example, display 330 may display text, graphics, images, etc. Control buttons 340 may permit the user to interact with user device 210 to cause user device 210 to perform one or more operations. For example, control buttons 340 may be used to cause user device 210 to access an application within user device 210, such as a calendar application. Keypad 350 may include a standard telephone keypad. Microphone 360 may receive audible information from the user.

Although FIG. 3 shows exemplary elements of user device 210, in other implementations, user device 210 may contain fewer, different, or additional elements than depicted in FIG. 3. In still other implementations, one or more elements of user device 210 may perform the tasks performed by one or more other elements of user device 210.

Figure 4:
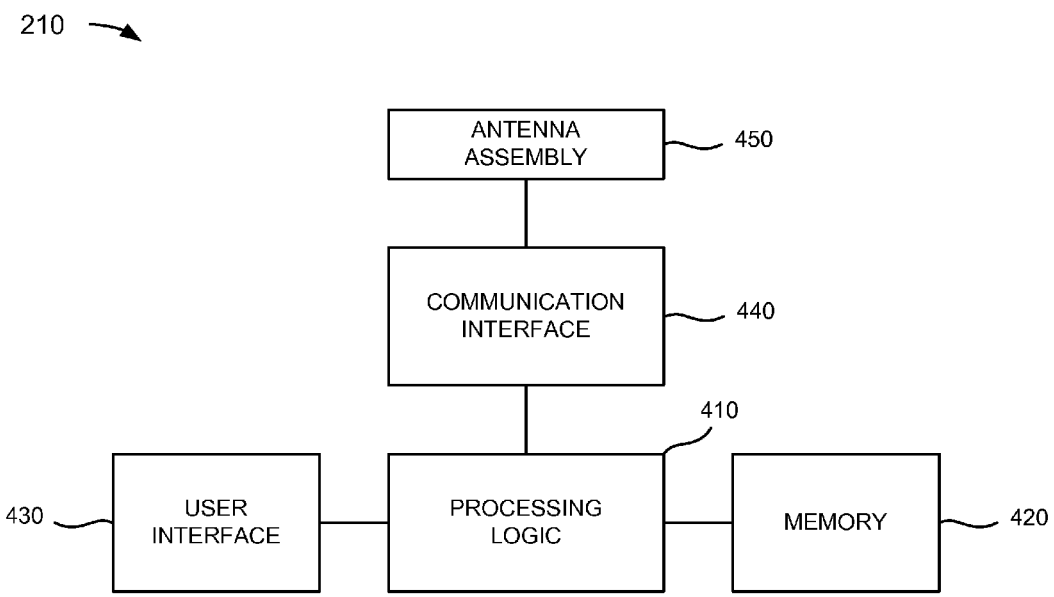
FIG. 4 is an exemplary block diagram of the user device of FIG. 3.

FIG. 4 is a diagram of exemplary components of user device 210. As shown in FIG. 4, user device 210 may include processing logic 410, memory 420, a user interface 430, a communication interface 440, and/or an antenna assembly 450. Processing logic 410 may include a processor, a microprocessor, an application specific integrated circuit (ASIC), a field programmable gate array (FPGA), or the like. Processing logic 410 may control operation of user device 210 and its components. Memory 420 may include a random access memory (RAM), a read only memory (ROM), and/or another type of memory to store data and instructions that may be used by processing logic 410.

User interface 430 may include mechanisms for inputting information to user device 210 and/or for outputting information from user device 210. Examples of input and output mechanisms might include buttons (e.g., control buttons 340, keys of keypad 350, a joystick, etc.) to permit data and control commands to be input into user device 210; a speaker (e.g., speaker 320) to receive electrical signals and output audio signals; a microphone (e.g., microphone 360) to receive audio signals and output electrical signals; a display (e.g., display 330) to output visual information (e.g., an image); and/or a vibrator to cause user device 210 to vibrate.

Communication interface 440 may include, for example, a transmitter that may convert baseband signals from processing logic 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna assembly 450 for transmission and/or reception of the RF signals. Antenna assembly 450 may include one or more antennas to transmit and/or receive RF signals over the air. Antenna assembly 450 may, for example, receive RF signals from communication interface 440 and transmit them over the air and receive RF signals over the air and provide them to communication interface 440. In one implementation, for example, communication interface 440 may communicate with a network, such as network 230.

Although FIG. 4 shows exemplary elements of user device 210, in other implementations, user device 210 may contain fewer, different, or additional elements than depicted in FIG. 4. In still other implementations, one or more elements of user device 210 may perform the tasks performed by one or more other elements of user device 210.

Figure 5:
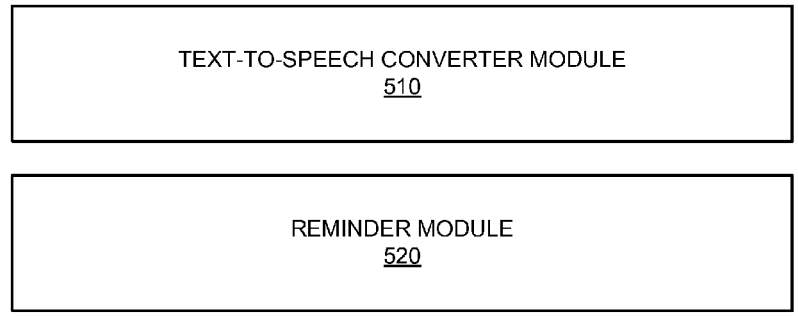
FIG. 5 is an exemplary functional diagram of a portion of the user device of FIG. 2.

FIG. 5 is an exemplary functional diagram of a portion of user device 210 according to an exemplary embodiment. As illustrated, user device 210 may include a text-to-speech converter module 510 and a reminder module 520. It will be appreciated that user device 210 may include other modules (not shown) that aid in providing reminder alerts to a user.

Text-to-speech converter module 510 may receive text and convert the text to a voice signal. In one embodiment, text-to-speech converter module 510 may receive the text from a calendar application in user device 210 and/or from another source.

Reminder module 520 may detect events and provide audible alerts and possibly visual alerts (e.g., images) in response to detecting the events. In one embodiment, reminder module 520 may detect events in response to an incoming telephone call. The events may include, for example, television programming reminders, meetings, birthdays, anniversaries, and/or other types of reminders for which a user may wish to receive a reminder alert. In one embodiment, the audible alerts may include voice messages. Reminder module 520 may receive the voice messages from a user (e.g., the user may record a voice message using user device 210), from another device, such as server 220, and/or from another source. In one embodiment, reminder module 520 may dynamically generate a voice message (e.g., by forwarding text for an event to text-to-speech module 510. Reminder module 520 may also store other information relating to an event. For example, the user may associate an image or video clip with an event. Reminder module 520 may cause the image to be displayed in response to detecting the event.

Figure 6:
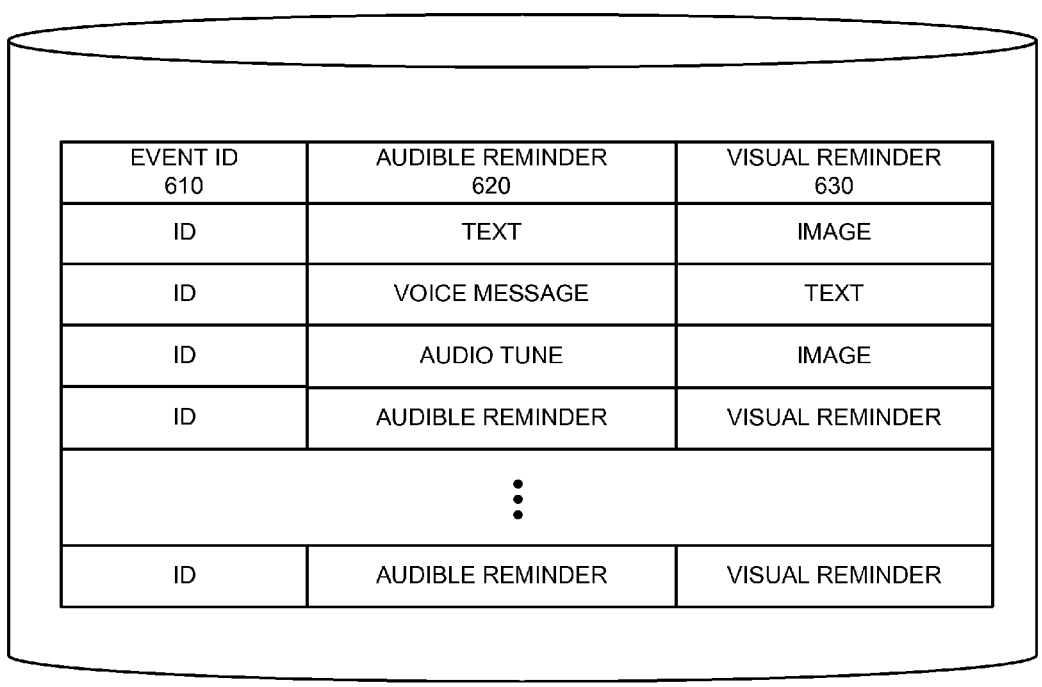
FIG. 6 is an exemplary diagram of a first portion of a computer-readable medium that may be associated with the user device of FIG. 2.

FIG. 6 is an exemplary diagram of a portion of a first computer-readable medium 600 that may be associated with reminder module 520. While only one computer-readable medium is described below, it will be appreciated that computer-readable medium 600 may include multiple computer-readable media stored locally at user device 210, or stored at one or more different and possibly remote locations, such as at server 220.

As illustrated, computer-readable medium 600 may maintain a group of entries in the following exemplary fields: an event identification (ID) field 610, an audible reminder field 620, and a visual reminder field 630. Computer-readable medium 600 may maintain additional or different information (not shown) relating to providing reminder alerts to users.

Event identification field 610 may store information that uniquely identifies an event. As indicated above, an event may include a television programming reminder, a meeting reminder, and/or other types of reminders for which a user may wish to receive a reminder alert, such as a birthday, an anniversary, etc. In one example, the information stored in event identification field 610 may include a sequence of characters.

Audible reminder field 620 may store a reminder or a link to a reminder that may be audibly provided if reminder module 520 detects the corresponding event identified in event field 610. The audible reminder may include text (which can converted via text-to-speech module 510 to a voice message), a voice message, an audio tune (such as a theme song to a television show), and/or other types of audible information.

Visual reminder field 630 may store a reminder or a link to a reminder that may be visually provided if reminder module 520 detects the corresponding event identified in even field 610. The visual reminder may include, for example, an image, text, graphics, a video clip, and/or other types of visual information.

Figure 7:
FIG. 7 is an exemplary diagram of a second portion of a computer-readable medium that may be associated with the user device of FIG. 2.

FIG. 7 is an exemplary diagram of a portion of a second computer-readable medium 700 that may be associated with reminder module 520. While only one computer-readable medium is described below, it will be appreciated that computer-readable medium 700 may include multiple computer-readable media stored locally at user device 210, or stored at one or more different and possibly remote locations.

As illustrated, computer-readable medium 700 may maintain a group of entries in the following exemplary field: a telephone number field 710. Computer-readable medium 700 may maintain additional or different information (not shown) relating to providing reminder alerts to users.

Telephone number field 710 may store a group of telephone numbers from which telephone calls may be received. In one embodiment, the group of telephone numbers may act as triggers for reminder alerts. If a telephone call is received from a telephone number in telephone number field 710, reminder module 520 may capture the current date and time and identify whether an event exists in a calendar application for the current date and time. A reminder alert may be provided in those situations where an event exists in the calendar application for the current date and time.

In other embodiments, reminder module 520 may capture the current date and time and identify whether an event exists in a calendar application for the current date and time in response to any incoming telephone call (regardless of whether the telephone number of the calling party appears in telephone number field 710).

Figure 8:
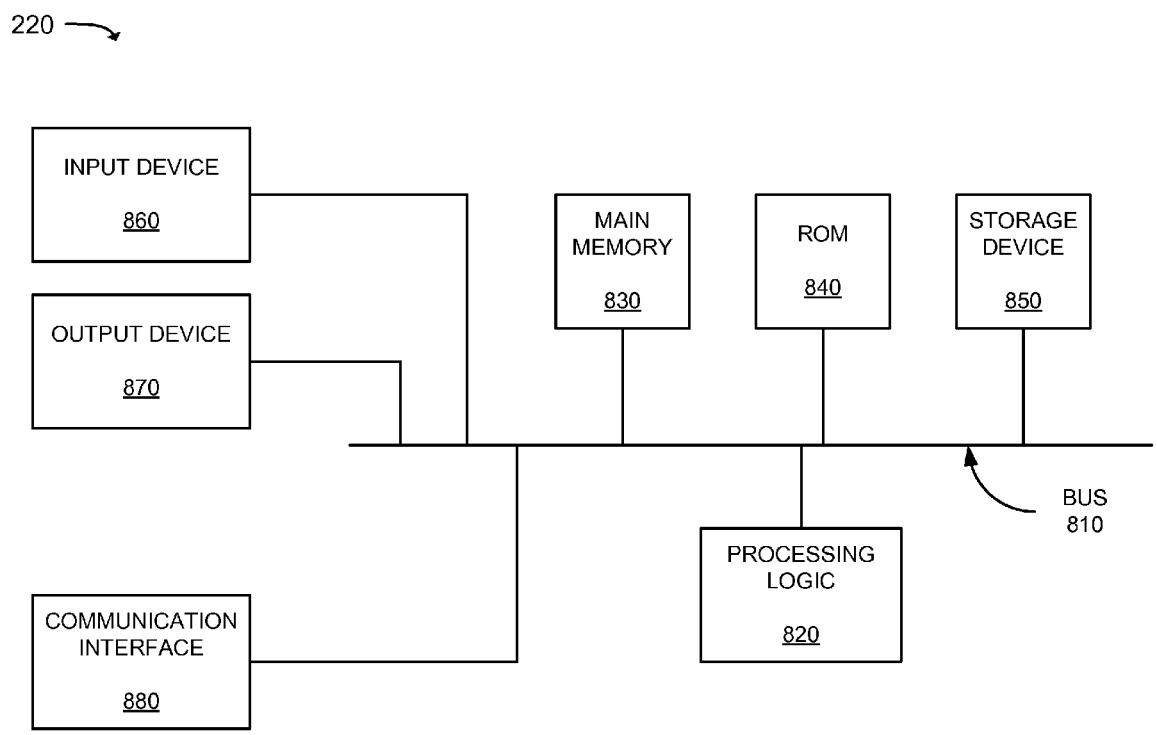
FIG. 8 is an exemplary block diagram of the server of FIG. 2.

FIG. 8 is an exemplary diagram of server 220 according to an exemplary embodiment. As illustrated, server 220 may include a bus 810, processing logic 820, a main memory 830, a ROM 840, a storage device 850, an input device 860, an output device 870, and a communication interface 880. It will be appreciated that server 220 may include additional (or other) components than illustrated in FIG. 8.

Bus 810 may include a path that permits communication among the elements of server 220. Processing logic 820 may include a processor, a microprocessor, or other types of processing logic, such as an ASIC, a FPGA, etc., that may interpret and execute instructions. Main memory 830 may include a RAM or another type of dynamic storage device that may store information and instructions for execution by processing logic 820. ROM 840 may include a ROM device or another type of static storage device that may store static information and instructions for use by processing logic 820. Storage device 850 may include a magnetic and/or optical recording medium and its corresponding drive.

Input device 860 may include a mechanism that permits an operator to input information to server 220, such as a keyboard, a mouse, a pen, voice recognition and/or biometric mechanisms, etc. Output device 870 may include a mechanism that outputs information to the operator, including a display, a printer, a speaker, etc. Communication interface 880 may include any transceiver-like mechanism that enables server 220 to communicate with other devices and/or systems, such as user device 210.

As will be described in detail below, server 220 may perform certain operations. Server 220 may perform these and other operations in response to processing logic 820 executing software instructions contained in a computer-readable medium, such as main memory 830.

The software instructions may be read into main memory 830 from another computer-readable medium, such as storage device 850, or from another device via communication interface 880. The software instructions contained in main memory 830 may cause processing logic 820 to perform processes that will be described later. Alternatively, hardwired circuitry may be used in place of, or in combination with, software instructions to implement processes consistent with exemplary embodiments. Thus, embodiments described herein are not limited to any specific combination of hardware circuitry and software.

Figure 9:
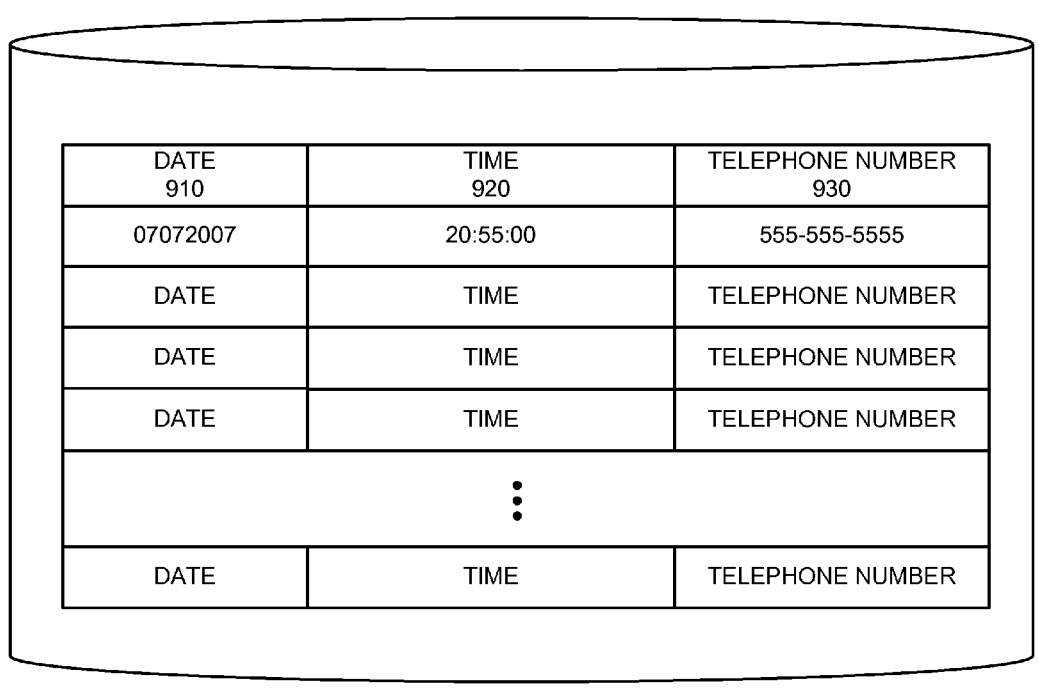
FIG. 9 is an exemplary diagram of a portion of a computer-readable medium that may be associated with the server of FIG. 2.

FIG. 9 is an exemplary diagram of a portion of a computer-readable medium 900 that may be associated with server 220. While only one computer-readable medium is described below, it will be appreciated that computer-readable medium 900 may include multiple computer-readable media stored locally at server 220, or stored at one or more different and possibly remote locations.

As illustrated, computer-readable medium 900 may maintain a group of entries in the following exemplary fields: a date field 910, a time field 920, and a telephone number field 930. Computer-readable medium 900 may maintain additional or different information (not shown) relating to providing reminder telephone calls to users.

Date field 910 may store information that identifies a date on which a reminder telephone call is to be placed. The date may be stored in a variety of formats. In the example illustrated in FIG. 9, the date may be stored in a month/day/year format. Time field 920 may store information that identifies a time at which a reminder telephone call is to be placed on the date identified in date field 910. The time may be stored in a variety of formats. In the example illustrated in FIG. 9, the time may be stored in an hour:minute:second format. Telephone number field 930 may store a telephone number (or telephone numbers) that is to be called at the date and time identified in date field 910 and time field 920, respectively. In the example illustrated in FIG. 9, server 220 may place a reminder telephone call on Jul. 7, 2007, at 8:55 PM, to telephone number 555-555-5555.

Figure 10:
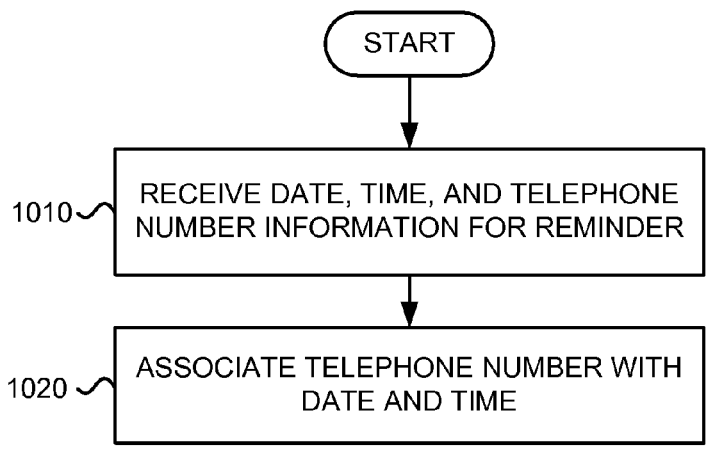
FIG. 10 is a flow chart of exemplary processing for establishing a reminder telephone call.

FIG. 10 is a flow chart of exemplary processing for establishing a reminder telephone call. In one embodiment, the processing of FIG. 10 may be performed by server 220. In another embodiment, some or all of the processing described below may be performed by another device.

Processing may begin with server 220 receiving date, time, and telephone number information for a reminder from a user (block 1010). In one embodiment, server 220 may request that a user first log in to server 220 prior to accepting the date, time, and telephone number information. As indicated above, the date, time, and telephone number information may include a date on which a reminder telephone call is to be made, a time at which the reminder telephone call is to be made, and a telephone number to which the reminder telephone call is to be made.

Server 220 may associate the telephone number information with the date and time information (block 1020). For example, server 220 may store the date, time, and telephone number information as an entry in computer-readable medium 900. As illustrated in FIG. 9, server 220 may receive a date of Jul. 7, 2007, a time of 9:00 PM, and a telephone number of 555-555-5555 from a user for a reminder telephone call.

Figure 11:
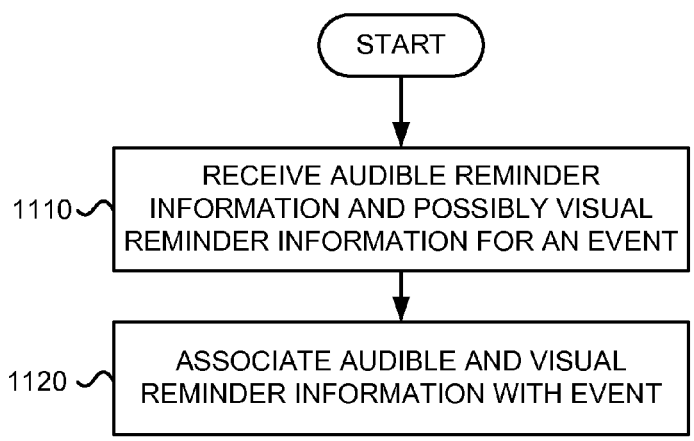
FIG. 11 is a flow chart of exemplary processing for associating information with an event.

FIG. 11 is a flow chart of exemplary processing for establishing a reminder alert. In one embodiment, the processing of FIG. 11 may be performed by user device 210. In another embodiment, some or all of the processing described below may be performed by another device, such as server 220.

Processing may begin with user device 210 receiving audible reminder information and possibly visual reminder information for an event (block 1110). For example, a user may record a voice message to be used as part of a reminder alert using user device 210 or may cause a voice message to be transferred to user device 210 (e.g., via network 230). A user may also provide visual information to be used as part of a reminder alert. For example, the user may capture an image using user device 210 or cause an image to be transferred to user device 210 (e.g., via network 230).

The audible and visual reminder information may be associated with the event (block 1120). For example, user device 210 may store the received audible reminder information (or a link to the received audible reminder information) in computer-readable medium 600 (e.g., in audible reminder field 620), along with information identifying the event. In addition, user device 210 may associate the received visual reminder information with the event by storing the visual reminder information (or a link to the visual reminder information) in the appropriate field (e.g., visual reminder field 630) in computer-readable medium 600.

Figure 12:
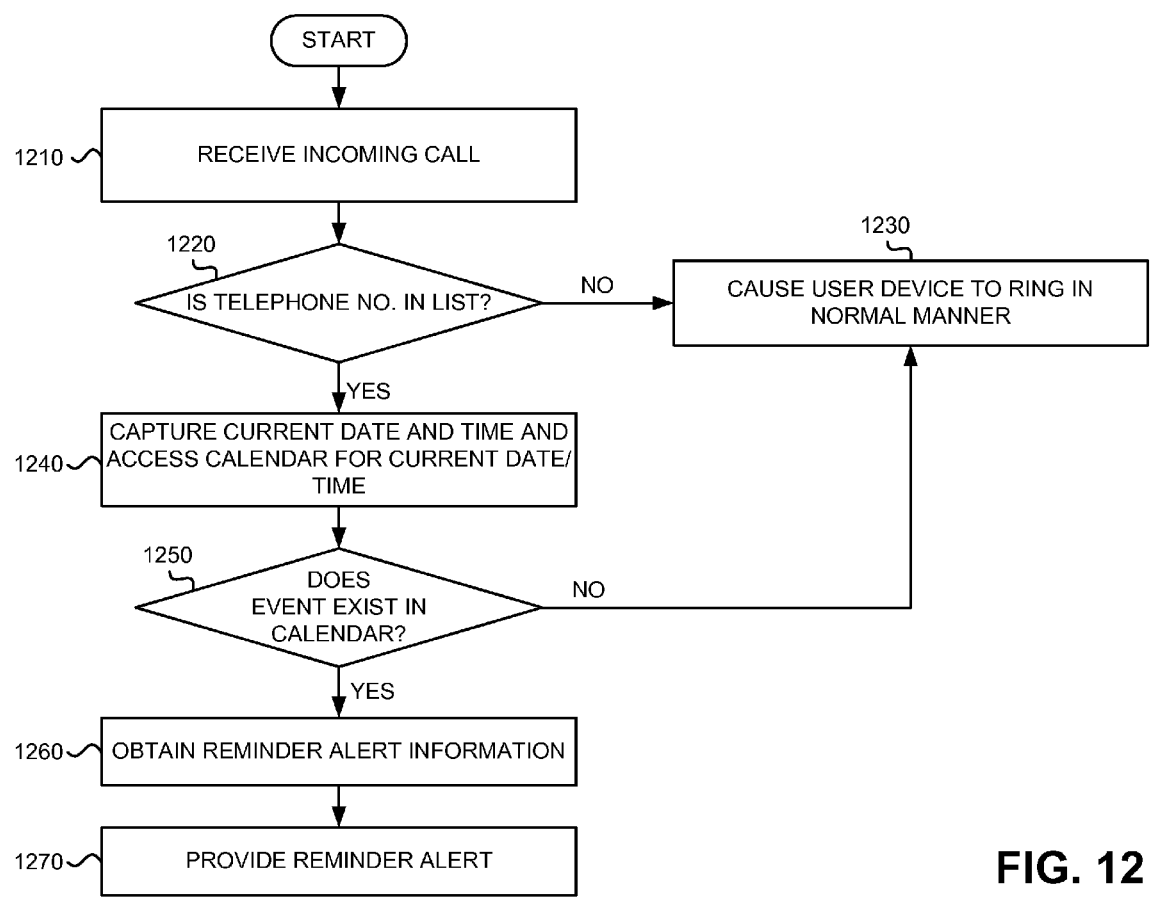
FIG. 12 is a flow chart of exemplary processing for providing reminder alerts.

FIG. 12 is a flow chart of exemplary processing for providing reminder alerts according to an exemplary embodiment. In one embodiment, the processing of FIG. 12 may be performed by user device 210. In another embodiment, some or all of the processing described below may be performed by another device, such as server 220.

Processing may begin with user device 210 receiving a telephone call (block 1210). The received telephone call may be associated with a calling telephone number (i.e., a telephone number associated with the calling party and/or the calling device). User device 210 may determine whether the calling telephone number is in a list of telephone numbers (block 1220). For example, user device 210 may compare the incoming telephone number to the telephone numbers in computer-readable medium 700.

If the incoming telephone number does not match a telephone number in computer-readable 700 (block 1220—NO), user device 210 may cause user device 210 to ring in a normal manner (block 1230). If, on the other hand, the incoming telephone number matches a telephone number in computer-readable medium 700 (block 1220—YES), user device 210 may capture the current date and time (block 1240). For example, user device 210 may access a date/time application within user device 210 to obtain the current date and time. User device 210 may access a calendar application for the current date and time (block 1240). For example, if the current date and time are Jul. 7, 2007 and 8:55 PM, respectively, user device 210 may access the calendar application for Jul. 7, 2007 at 8:55 PM.

User device 210 may determine whether an event exists in the calendar application for the current date/time (block 1250). In the example above, user device 210 may determine whether an event exists in the calendar application on Jul. 7, 2007 at 8:55 PM. If no event exists in the calendar application for the current date/time (block 1250—NO), user device 210 may cause user device 210 to ring in a normal manner (block 1230). If, on the other hand, an event exists in the calendar application for the current date/time (block 1250—YES), user device 210 may obtain reminder alert information for the event (block 1260). User device 210 may obtain an audible and/or visual message (or identify a location of an audible/visual message) from a local memory (e.g., from audible reminder field 620 and/or visual reminder field 630 of computer-readable medium 600). Alternatively, user device 210 may dynamically create an audible message. For example, user device 210 may convert the text for the event stored in the calendar application to a voice message (e.g., using text-to-speech module 510). As another alternative, user device 210 may retrieve audible reminder information and/or visual reminder information from a remote device, such as a server (e.g., server 220). For example, user device 210 may send a request for audible reminder information and/or visual reminder information to a server based on the event stored in the calendar application. In response to the request, the server may send the audible and/or visual reminder information relating to the event to user device 210.

User device 210 may provide a reminder alert for the event (block 1270). For example, user device 210 may provide audible reminder information to the user (e.g., via speaker 320). Additionally, user device 210 may provide visual reminder information to the user (e.g., via display 330).

The following examples of FIGS. 13A-15C illustrate the processing described above with respect to FIG. 12. In a first example 1300 described with respect to FIGS. 13A and 13B, assume that a user's user device 1310 includes a calendar application 1320. Moreover, assume that the user has stored an entry 1330 in calendar application 1320. In example 1300, entry 1330 indicates that the user has a 12:00 PM lunch appointment with Nick at a restaurant called Rio. Assume further that the user has set up a reminder telephone call for the appointment with a server, such as server 220.

At approximately the time of the appointment, server 220 may call the user's user device 1310. In response to receiving the reminder telephone call, user device 1310 may determine that an entry 1330 exists in calendar application 1320 for the current date/time. In this example, user device 1310 may detect the lunch appointment with Nick in calendar application 1320.

Figure 13A:
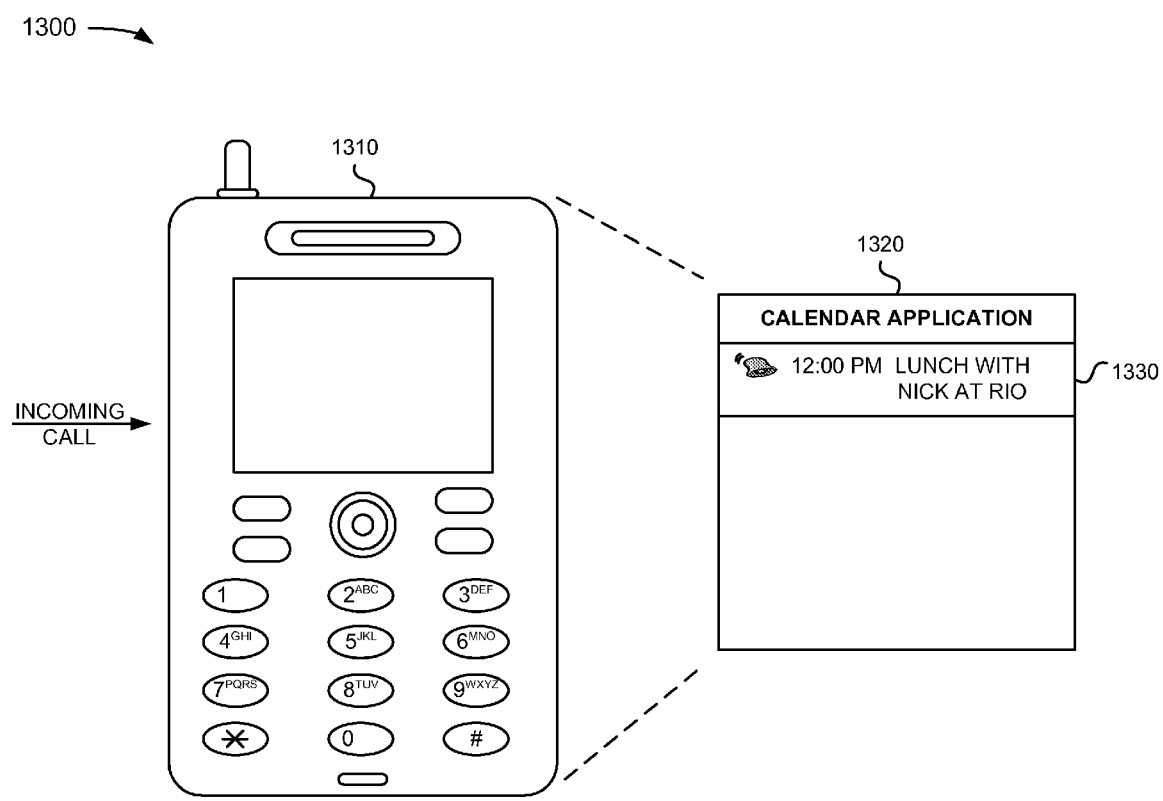
FIGS. 13A to 15C illustrate examples of the processing described with respect to FIG. 12.
Figure 13B:
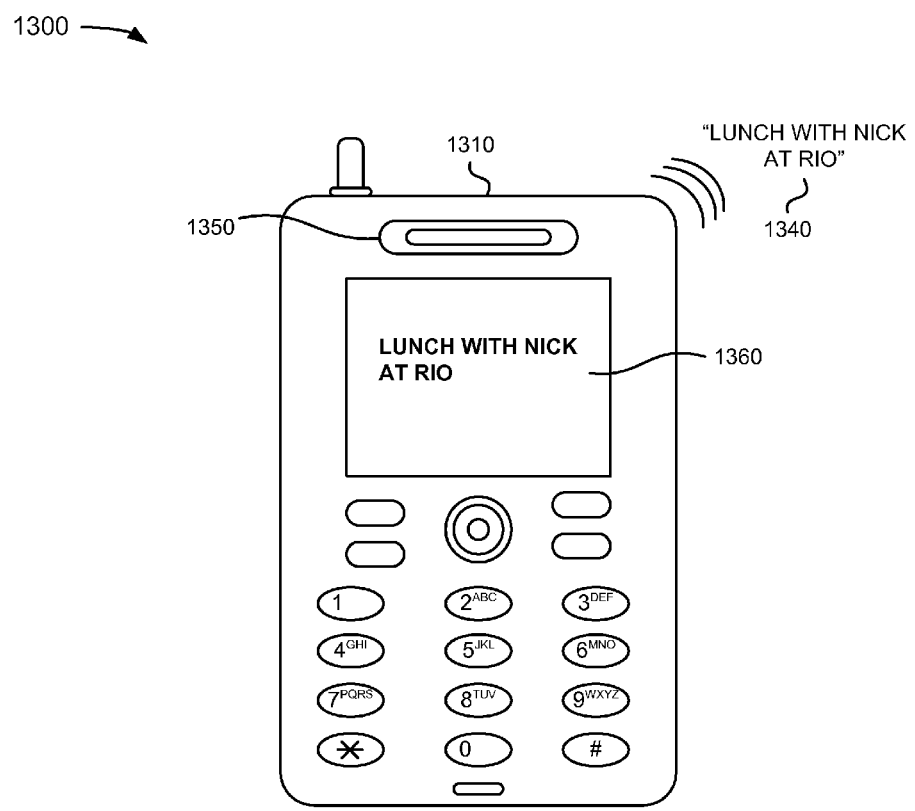

User device 1310 may create a voice message to be provided to the user for entry 1330 by, for example, converting the text of calendar entry 1330 to a voice message 1340 (e.g., using text-to-speech converter module 710), as illustrated in FIG. 13B. User device 1310 may provide voice message 1340 (e.g., "Lunch with Nick at Rio") to the user via a speaker 1350. In addition, user device 1310 may provide the text of calendar entry 1330 to a display 1360 for display to the user. In this way, the user may be audibly and visually reminded of the lunch appointment.

Figure 14A:
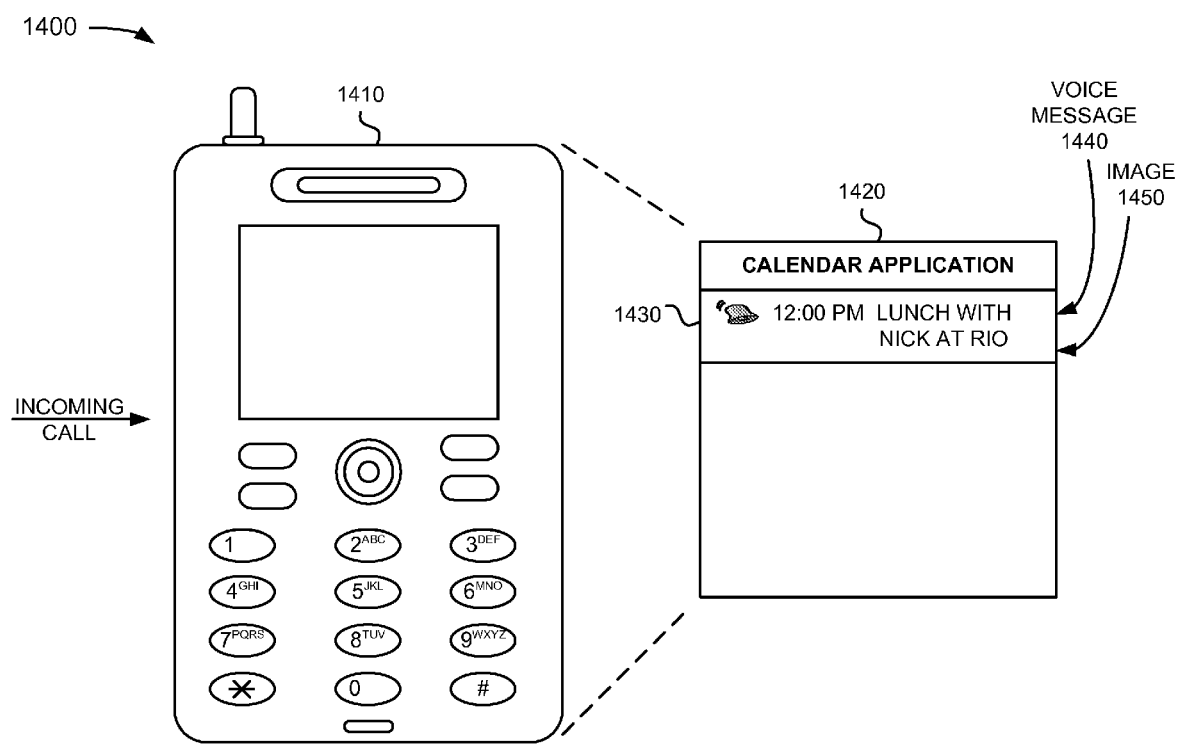
Figure 14B:
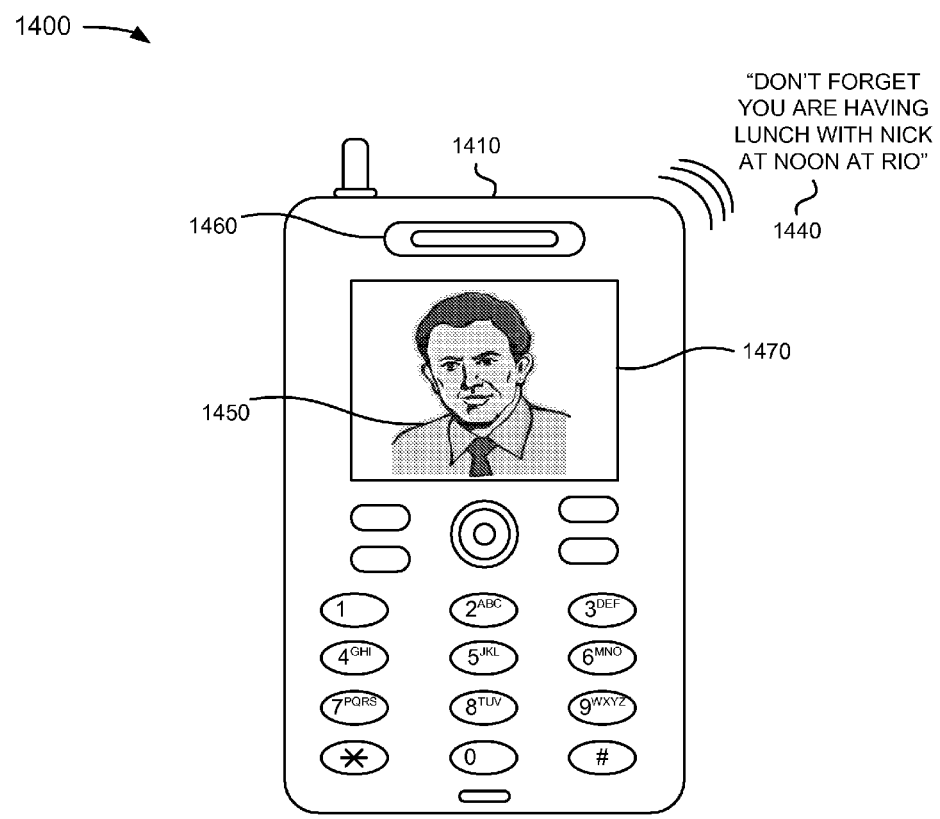

In a second example 1400 set forth in FIGS. 14A and 14B, assume that a user's user device 1410 includes a calendar application 1420 (FIG. 14A). Moreover, assume that the user has stored an entry 1430 in calendar application 1420. In example 1400, entry 1430 may indicate that the user has a 12:00 PM lunch appointment with Nick at a restaurant called Rio. Further, assume that the user has associated a reminder alert with calendar entry 1430. In example 1400, assume that the reminder alert includes a voice message (which says "Don't forget you are having lunch with Nick at noon at Rio") and an image 1450 (e.g., a picture of Nick) that, for example, may be associated with entry 1430 (e.g., in computer-readable medium 600).

At approximately the time of the appointment, assume that user device 1410 receives a telephone call. In response to the telephone call, user device 1410 may determine whether an entry exists in calendar application 1420. In example 1400, user device 1410 may detect the occurrence of calendar entry 1430 and may, in response, retrieve voice message 1440 and provide voice message 1440 to the user via a speaker 1460. In addition, user device 1410 may retrieve image 1450 and provide image 1450 to a display 1470 for display to the user. In this way, the user is reminded of the lunch appointment both audibly and visually.

Figure 15A:
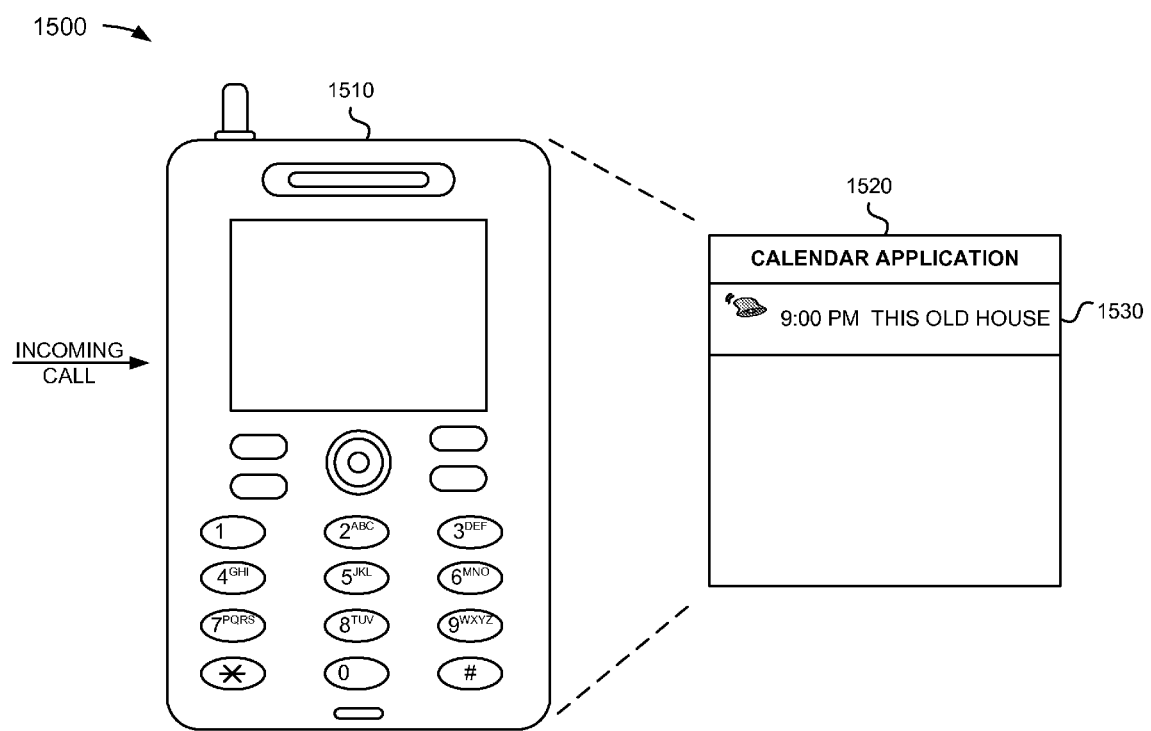
Figure 15B:
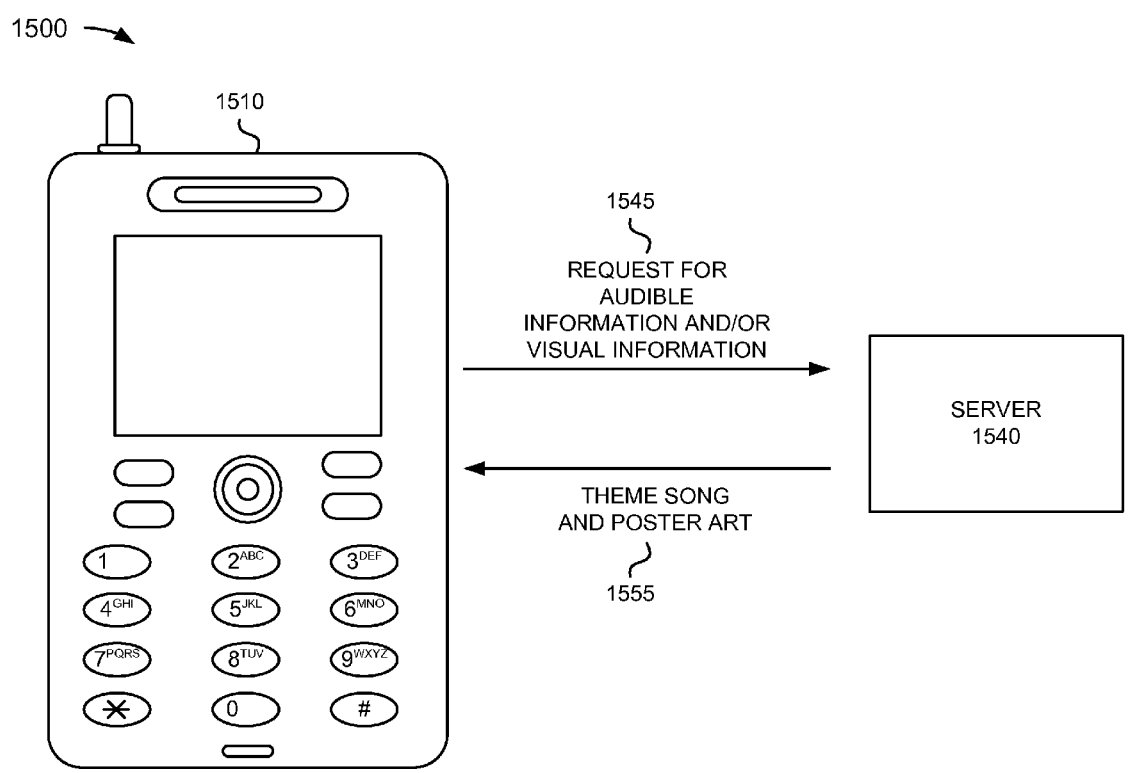
Figure 15C:
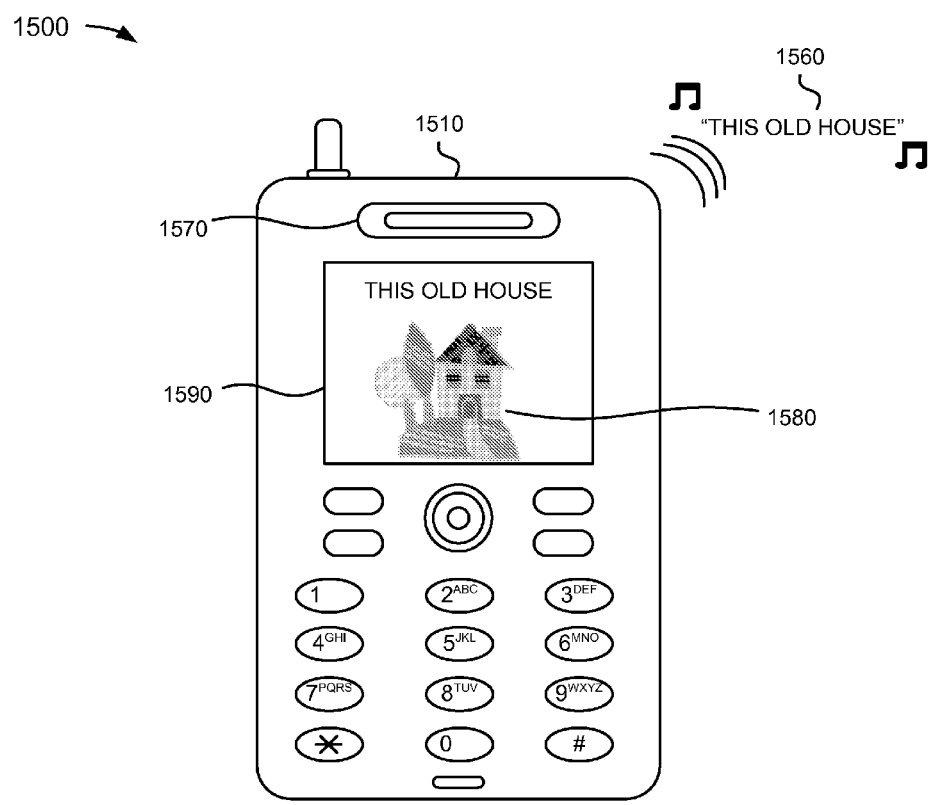

In a third example 1500 set forth in FIGS. 15A-15C, assume that a user's user device 1510 includes a calendar application 1520 (FIG. 15A). Moreover, assume that the user has stored an entry 1530 in calendar application 1520. In example 1500, entry 1530 indicates that the user is interested in watching a television program called "This Old House" at 9:00 PM. Assume further that the user has set up a reminder telephone call for the television program with a server, such as server 220.

At approximately the time of the appointment, server 220 may call the user's user device 1510, as illustrated in FIG. 15A. In response to receiving the reminder telephone call, user device 1310 may determine that an entry 1530 exists in calendar application 1520 for the current date/time. In this example, user device 1510 may detect the television program reminder in calendar application 1520.

User device 1510 may send a request 1545 for information relating to the television program to a server 1540 (which may or may not be associated with server 220), as illustrated in FIG. 15B. Request 1545 may include information identifying the television program "This Old House." Server 1540 may receive request 1545 and obtain audible and/or visual information for the television program. For example, server 1540 may obtain the theme song and poster art for the television program. Server 1540 may send the theme song and poster art in a response 1555 to user device 1510. Alternatively, user device 1510 may request the audible and/or visual information prior to receiving the telephone call.

User device 1510 may provide theme song 1560 to the user via a speaker 1570. In addition, user device 1510 may provide poster art 1580 to a display 1590 for display to the user. In this way, the user is reminded of the start of the television program both audibly and visually.

Embodiments described herein provide incoming call-initiated reminder alerts that include a voice message and possibly visual information.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while the above description focuses on associating (or obtaining) reminder information (audible reminder information and/or visual reminder information) with calendar events, it will be appreciated that embodiments described herein are not so limited. For example, in another embodiment, a user device or server may associate particular telephone numbers with reminder information. As an example, assume that a user device associates a particular telephone number with a particular audible message (e.g., the song "happy birthday"). Another user may want to cause the user device to play the song. To do so, the other user may access the server and schedule a date and time for the server to call the user device, using the particular telephone number as the calling telephone number. In response to receiving the telephone call, the user device may obtain the song locally or remotely and play the song for the user of the user device.

While series of acts have been described with respect to FIGS. 10-12, the order of the acts may be varied in other implementations consistent with the invention. Moreover, non-dependent acts may be implemented in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a memory to store instructions; and
a processor to execute the instructions to:
receive a telephone call,
identify a calendar event in response to receiving the telephone call,
the calendar event being identified based on a date and a time when the telephone call is received,
generate a voice message related to the calendar event, and
cause the voice message to be audibly provided to a user of the device.

2. The device of claim 1, where the telephone call is associated with a calling telephone number, and
where the processor is to:
determine whether the calling telephone number matches a telephone number in a list of telephone numbers, and
identify the calendar event when the calling telephone number matches a telephone number in the list of telephone numbers.

3. The device of claim 1, where the calendar event is associated with text information, and
where, when generating a voice message, the processor is to:
generate the voice message using the text information,
where the voice message does not exist prior to receiving the telephone call, the voice message being generated based on the calendar event being identified based on a date and a time when the telephone call is received.

4. The device of claim 1, where the calendar event is associated with text information, and
where, when generating a voice message, the processor is to:
convert the text information to the voice message using a text-to-speech technique,
where the voice message does not exist prior to receiving the telephone call, the voice message being generated based on the calendar event being identified based on a date and a time when the telephone call is received.

5. The device of claim 4, where the calendar event is associated with an item, and
where, in response to identifying the calendar event, the processor is to:
retrieve the item, and
cause the item to be visually provided to the user,
where the item is visually provided in addition to the voice message.

6. The device of claim 1, where the processor is further to:
transmit a request for an item to a remote device in response to identifying the calendar event,
receive the item from the remote device, and
cause the item to be visually provided.

7. A method comprising:
receiving a telephone call;
capturing a date and a time when the telephone call is received;
determining whether a calendar event, of a calendar application, that corresponds to the date and the time exists, in response to receiving the telephone call;
obtaining a voice message relating to the calendar event, when the calendar event exists,
the voice message not existing prior to receiving the telephone call,
the obtaining the voice message including:
dynamically generating the voice message based on information included in the calendar event, the voice message including the information; and
audibly providing the voice message.

8. The method of claim 7, further comprising:
receiving a second telephone call;
identifying a second calendar event in response to receiving the second telephone call;
obtaining a second voice message relating to the second calendar event, where obtaining the second voice message includes:
retrieving the second voice message from a memory; and
audibly providing the second voice message.

9. The method of claim 7, where obtaining the voice message based on the information associated with the calendar event further includes:

generating the voice message based on text associated with the calendar event.

10. The method of claim 7, further comprising:
receiving a second telephone call;
identifying a second calendar event in response to receiving the second telephone call;
obtaining a second voice message relating to the second calendar event,
where obtaining the second voice message includes:
   obtaining the second voice message from a remote location; and
audibly providing the second voice message.

11. The method of claim 7, further comprising:
obtaining an item relating to the calendar event; and
visually providing the item,
where the item is visually provided with the voice message.

12. The method of claim 11, where the item includes an image or textual information.

13. A device comprising:
a memory to store instructions; and
a processor to execute the instructions to:
   receive a telephone call,
   identify a calendar entry in response to receiving the telephone call,
   automatically create a ring tone related to the calendar entry, and
   cause the ring tone to be audibly provided to a user.

14. The device of claim 13, where, when automatically creating a ring tone, the processor is to:
convert text to a voice message in response to receiving the telephone call, the ring tone including the voice message.

15. The device of claim 13, where the calendar entry is identified based on a date and a time when the telephone call was received,
where the calendar entry includes textual information, and
where the processor is further to convert the textual information to the ring tone.

16. The device of claim 13, where the processor is further to:
retrieve an item in response to receiving the telephone call, and
cause the item to be visually provided to the user,
where the item is visually provided with the ring tone.

17. A device comprising:
a memory to store instructions; and
a processor to execute the instructions to:
   receive a telephone call,
   identify a television program reminder, related to a calendar event, in response to receiving the telephone call,
   obtain a theme song for the television program, and
   cause the theme song to be provided to a user.

18. The device of claim 17, where, when identifying the television program reminder, the processor is to:
access a calendar application to locate a calendar entry corresponding to a date and a time when the telephone call was received.

19. The device of claim 17, where, when obtaining the theme song, the processor is to:
obtain the theme song from a local memory.

20. The device of claim 17, where, when obtaining the theme song, the processor is to:
obtain the theme song from a remote device.

21. The device of claim 17, where the processor is further to:
obtain an image for the television program, and
cause the image to be visually provided to the user,
where the image is visually provided with the theme song.

* * * * *